United States Patent [19]
Nakanishi et al.

[11] Patent Number: 5,552,947
[45] Date of Patent: Sep. 3, 1996

[54] SUPPORTING APPARATUS FOR A MAGNETIC HEAD

[75] Inventors: Kazuhiro Nakanishi, Hachioji; Shin Isozaki, Hino; Shozo Kikugawa, Hino; Hiroaki Yamagishi, Hino, all of Japan

[73] Assignee: Konica Corporation, Tokyo, Japan

[21] Appl. No.: 340,363

[22] Filed: Nov. 14, 1994

[30] Foreign Application Priority Data

Nov. 16, 1993 [JP] Japan ................................ 5-286978

[51] Int. Cl.⁶ .......................... G11B 5/48; G11B 21/20
[52] U.S. Cl. ............................... 360/104; 360/109
[58] Field of Search .................................. 360/104, 107, 360/109, 128

[56] References Cited

U.S. PATENT DOCUMENTS

| | | | |
|---|---|---|---|
| 4,628,386 | 12/1986 | Chabrolle | 360/109 X |
| 4,943,881 | 7/1990 | Isozaki et al. | 360/104 |
| 5,091,811 | 2/1992 | Chang | 360/104 |
| 5,270,523 | 12/1993 | Chang et al. | 360/2 X |

FOREIGN PATENT DOCUMENTS 60-55571   3/1985   Japan .................................. 360/104
61-142521  6/1986   Japan .................................. 360/104

*Primary Examiner*—John H. Wolff
*Attorney, Agent, or Firm*—Finnegan, Henderson, Farabow, Garrett & Dunner, L.L.P.

[57] ABSTRACT

A magnetic head supporting mechanism for supporting a magnetic head for writing and reading information on a magnetic layer of a photographic film by tracing the information with the magnetic head in a predetermined conveyance direction of the photographic film. The mechanism includes: a fixing frame, which is fixed to the body of the magnetic head supporting mechanism, for pivotally supporting a head supporting frame and the magnetic head; and the head supporting frame for supporting the magnetic head. The fixing frame includes recess portions, each positioned at each of both sides of the fixing frame in relation to the predetermined conveyance direction, for movably supporting semi-circular protrusions of the head supporting frame; and the head supporting frame includes the semi-circular protrusions, each positioned at a front side and a back side of the head supporting frame in relation to the predetermined conveyance direction, for movably coupled with the recess portions of the fixing frame.

9 Claims, 5 Drawing Sheets

SUPPORTING APPARATUS FOR A MAGNETIC HEAD

BACKGROUND OF THE INVENTION

The present invention relates to a supporting apparatus for a magnetic head which is in contact with a magnetic layer of a photographic film, on which a transparent magnetic layer is coated, and at least, records information or plays back the recorded information.

Recently, the performance of respective apparatus consisting of a photographic system, for example, film, camera, processing apparatus, etc. has been greatly improved. However, because information interchange between apparatus is not satisfactory, it is difficult to further increase the performance of apparatus and decrease costs of the total system. For example, a current color printing system presumes photographic conditions from a optical density of a developed negative image, determines printing conditions, and performs printing so that the printing will satisfy the greatest number of customers. Accordingly, the printing is carried out so as to obtain a print having an average characteristic, thereby photographic conditions and the photographer's intentions can not fully be reflected on the print, and the performance of a film and camera can not be fully exhibited. Accordingly, in order to fully respond to user's requirements, it is necessary to carry out printing including the photographic conditions. Further, since the post-exposure treatment of the film is carried out in darkness or in water, transmission of the information is difficult, so that computerized automation is difficult.

As a means for easily interchanging information in a photographic system, the following systems have been proposed in International Applications WO-90/04205, WO-90/04214, U.S. Pat. Nos. 4,975,732, 4,975,732, etc.: a system in which a substantially transparent magnetic recording layer is provided over the entire back surface of the film, and required information is directly recorded on that magnetic layer of the film. That is, at the time of film production, the manufacturer's name, the type of the film, the emulsion lot, sensitivity, manufacturing date, any reference signals, etc., are recorded. At the time of exposure, photographing conditions, for example, the color temperature of the light source, brightness of the subject, the exposure time, the F-number, rear-lighting or not, using flash or not, continuous photographing or not, the type of a camera, the owner's ID, the date of exposure, the photographer's memoranda, etc., are recorded for each frame of the film. Further, when a DPE shop receives the exposed film, customer order information, for example, sizes of prints, the number of prints, the finished condition of prints (silk finish, or gloss finish), etc. are recorded in the film. At the time of printing, this information is read out from the film, and printing conditions are determined from the information accompanied with optical density data obtained when the negative film is scanned. By the above-described operations, prints which reflect the photographic conditions and the photographic intention can be obtained. Further, these printing exposure conditions are recorded in each frame of the film, and when the recorded information are read out at the time of reordering prints, prints having the same color tone as the first print can be obtained. As described above, since the photographic information can be directly magnetically recorded on each frame of the film, photographic processing can be automatically computer controlled, resulting in decrease of cost, increase of quality, rapidity of processing, improved service control, etc. Features of this system are as follows: the film can perfectly correspond to the information when the information is directly recorded on the film; and the information can be easily interchanged between apparatus even when the film conveyance speed is not determined between apparatus when a signal modulation system, which is insensitive to chage and fluctuations of the film conveyance speed, is adopted into this system.

As a recording means for recording the information other than the image on a film, a recording means except the magnetic recording means, for example, an electrical, or optical means can be considered. However, these means have the following disadvantages: the electrical means using an IC memory, etc., are expensive; and the optical means using LEDs, etc., has a small memory capacity, and is not rewritable. Accordingly, a means by which information is directly magnetically recorded on the film, is most suitable for this purpose as a means in which the cost is low, the recording density is high, the information memory is freely rewritable, the image perfectly corresponds to the information, and the information can be easily interchanged between apparatus.

Generally, magnetic recording is carried out as follows: a signal current flows in coils of a magnetic head (hereinafter, called a head); and a magnetic layer is magnetized by a generated magnetic field for recording. Reproducing is carried out when the head coil picks up the leakage flux from the surface of the magnetic layer. Since the leakage flux, generated from a head-gap or the magnetic layer surface, is very small, and the attainable distance of the leakage flux is very short, a reproducing output and the S/N ratio are greatly lowered when the head is not in correct contact with the magnetic layer and a small gap exists between the head and the magnetic layer. When a portion of signals is missing, serious errors occur. Accordingly, the surface contact, of the surface of a medium, with the head surface is very important. In magnetic recording, a track is provided on a recording medium and signals are recorded on the track. Tracking is regarded as important because a reproducing output or an S/N ratio is greatly lowered when the head can not correctly trace the track. Further, in magnetic recording, because the medium is magnetized by the leakage flux of a magnetic head-gap, and the leakage flux of the medium is picked up by the reproducing head-gap, it is necessary that the angle of the recording head-gap is equal to that of the reproducing head-gap. Even when the difference between two angles is only 1 degree, the reproducing output is greatly lowered. This phenomenon is referred to as an azimuth loss, and it is important to prevent it. Generally, a magnetic recording medium is made in such a manner that the magnetic material is densely packed. The reason for this is that the reproducing output or the S/N ratio depends on the packed amount of magnetic material. Further, in magnetic recording, the running speed and position of the recording medium are strictly specified, and are essential requirements in magnetic recording. In contrast to the foregoing, the method, by which a film is directly magnetically recorded, according to the present invention, is largely different from the conventional magnetic recording method. For example, in a photographic processing apparatus, when a 3-part recording modulation system, etc. is adopted which has been disclosed in U.S. Pat. Nos. 4,912,467, 4,876,697, and 5,025,328, it is not necessary that the running speed is strictly controlled in the same way as that in conventional magnetic recording apparatus. Further, in order to maintain the film transparency, the amount of the magnetic material used for the magnetic layer provided on the film is limited to $\frac{1}{50}$ to $\frac{1}{100}$ of the amount used for normal magnetic recording medium. Accordingly, the reproducing signal intensity obtained from the film is extremely small. In a normal magnetic recording medium such as a video tape which is made in the manner that a large amount of magnetic material is packed, its influence is small even when some degree of head contact failure, tracking error, or azimuth loss is caused, because its reproducing output is high. However, the output of the transparent magnetic layer is 1/50 through 1/100 of that of a normal magnetic recording medium. Therefore, signals tend to be missed when head contact failure, tracking error, or azimuth loss is caused, and there is also the possibility that serious errors are caused. As described above, in recording on and reproducing from the transparent magnetic layer, it is important to prevent head contact failure, tracking error, or azimuth loss. However, since the film is stiffer than the magnetic tape, and curl or core-set is larger, head contact failure, tracking error, or azimuth loss occurs easily. Further, since the running accuracy of the photographic processing apparatus is greatly reduced from that of the magnetic recording apparatus, tracking error or azimuth loss easily occurs. As described above, recording on and reproducing from the transparent magnetic layer of film include more difficult technological problems than those of conventional magnetic tapes.

Conventional magnetic recording is compared with magnetic recording in a film with a substantially transparent magnetic layer in the present invention, and problems at the time of recording on and reproducing from the magnetic layer provided on the film will be described below. Here, the transparent magnetic layer is very thin (not more than 1 µm, preferably 0.1 µm), and the ratio of the magnetic layer on the film is small. Accordingly, physical properties of the film with the magnetic layer are regarded as substantially the same as those of the photographic film, in this explanation.

Generally, a magnetic tape consists of a thin support base and a specifically soft binder such as polyurethane in order to obtain the correct contact of the head with the tape.

In contrast to this, the thickness of the support of the film is 5 to 10 times that of the tape. Since photographic emulsion is dissolved in water and dispersed, and it is subjected to water system coating, binder to be used is limited to water soluble resin which is hard and which has poor flexibility. Therefore, the film is much stiffer than the tape, and is not flexible. Since several ten-layers of foundation layer, photosensitive layer, protective layer, etc. are formed on the support base of the film, the film is very complex compared with the magnetic tape. An anti-curl layer is provided on the opposite side of the film support. However, if the balance between layers is lost, the film tends to curl extremely. Further, if silver is removed during development, the physical properties of the film may change. Specifically, the stiffness or curling condition may change greatly. Further, since the film is processed in wet and dry processes, curling occurs dependent on the degree of drying. The degree of drying is easily changed depending on fluctuations of temperature and humidity. Not only does extreme curling occur over the width direction of the film, but also extreme core-set occurs along the length of the film. These factors are complex in the film, and non-uniform strain occurs in the film.

The transparent magnetic layer is coated over the entire surface of the film, and information can be recorded on the entire surface. However, since recording density is high in magnetic recording, the edge portions outside the image area can be sufficient for recording such information. Generally, photographic film is stiffer than magnetic tape, and often curls concavely in such a manner that the emulsion surface is inside the curl of the film. Especially, extreme curling occurs at the edge portions. Further, this curled portion fluctuates greatly depending on a lapse of time, temperature and humidity variance, developing processing, and other factors. Accordingly, it is difficult to obtain good head contact in the edge portion at which the strong curling occurs.

So-called magnetic film, in which a magnetic layer is provided on the same support base as the photographic film, is used for audio recording on movies. This magnetic film is also stiff and head contact property is poor. However, since the amount of magnetic particles used is not limited, magnetic layer, the amount of which is several times of that of normal magnetic tapes, is used so that an excellent S/N ratio can be obtained. Accordingly, its output is high and head contact property is less problem. Further, in audio recording, an instantaneous signal skips are not so serious. However, in recording in the photographic film, digital codes are used, so that as a general rule signal skips are not acceptable.

As described above, magnetic recording on film with a transparent magnetic layer includes far more difficult problems compared with conventional magnetic recording. The present invention can solve these problems by a new magnetic head supporting apparatus.

A head supporting apparatus for photographic film has been disclosed in U.S. Pat. Nos. 5,034,836, and 5,041,933. These apparatus are structured as follows: both edges of the film are sandwiched with two film guides on which heads are attached; the entire head unit makes an arc motion depending on the fluctuation of the film angle; and a large number of bearings are combined so that the heads can follow the irregularity of the film edges. These inventions cope with track deviation of the head caused by irregularities of the film edges.

Further, an invention has been disclosed in U.S. Pat No. 5,005,031, in which the head is tilted 3 to 4 degrees in such a manner that the head conforms to the curl of the film, in order to approximate the head to the degree of tilt of the film caused by the curl. In this invention, good head contact can be obtained. However, since the curl of the film varies greatly depending on changes of temperature or humidity, even when the head is tilted in such a manner that the head conforms to a predetermined curl, excellent head contact can not always be realized. Further, because the shape of a head portion is not regulated, there is the possibility that the film can be damaged.

SUMMARY OF THE INVENTION

In the present invention, an angle of the head surface changes (rolls) in such a manner that the head surface follows a film surface corresponding to a curl, distortion, and the like existing in the width direction of the film. Further, the present invention provides a structure by which the backlash of a supporting fulcrum is eliminated, and the fluctuation of a position of a track in a magnetic gap is minimized even when the head is subjected to rolling caused by curling of the film, or the like.

There are many problems, which can not be solved by conventional technology, in recording on and reproducing from film with a transparent magnetic layer. For example, the following method is widely used as an established method of magnetic recording technology: a method in which a magnetic recording medium follows along a fixed head curved surface and good head contact is obtained. However, it is difficult to apply this method to film which is stiff and rigid. When a head is forced strongly against film, the head can follow largely curled film. However, signals will be unstable and film damage can not be avoided. Since the transparent magnetic layer is provided on the entire surface of the film, and an image portion can also be recorded, film damage becomes a serious problem. Curling is large on both ends of the film, so that these end portions are areas at which there is poor head contact with the film. Further, when the head is forcibly contacted with the stiff and rigid film, there is much wear on the head. Improper contact of the head with the film become cause for various types of modulation noise. Since low level reproducing signals are amplified by a high gain amplifier, this noise is highly amplified, and the signal quality is largely lowered.

The head is required to correctly track the magnetic track of the film while being in close contact with the film. However, when the head follows the fluctuation of the film curl, while being in close contact with the film, and the angle of the head surface fluctuates, there is the possibility that the position of the magnetic gap of the head deviates from the position of the magnetic track. When the track position deviates at the time of signal recording and signal reading, signal output is lowered, or the S/N ratio is lowered when being mixed with previous signals, and what is worse, errors are caused.

Generally, in magnetic recording technology, it is a requirement that the surface of the magnetic head is in perfect contact with the surface of the magnetic layer. Accordingly, even when a gap of about 1 μm is formed between them, a signal can not be correctly recorded/reproduced. Especially, since the amount of use of the magnetic agent in the transparent magnetic layer is extreme small compared with that of normal magnetic tape, the head contact is important. Accordingly, when the magnetic head is mounted on the apparatus, the following structure is preferable: the angle of the head surface can change while following the curl of the film edge.

When the angle of the head surface changes while following the curl of the film, the contact of the head with the film becomes good. However, when the head moves excessively due to speed fluctuations or fluctuations of tension during film running, there is a possibility that recording/reproducing can not be normally carried out. Further, at the film edge portion, the force applied from the film against the head tends to become unbalanced, and when the head is moved excessively, there can be cases in which recording/reproducing are prevented.

The magnetic head supporting apparatus of the present invention is characterized in that: the head can roll in response to the curl in the width of the film, and the above-described disadvantages can be solved by regulating the movement of the head at this mime.

An apparatus disclosed in Japanese Patent Publication Open to Public Inspection No. 504316/1992 is structured as follows: a head is fixed onto a pressure plate of a camera; a guide surface is provided on at least one side of the pressure plate, and is engaged with the reference edge of a film; the pressure plate is pressed against the film perpendicularly to the length of the film so as to be engaged with the film; a pad is used so that the head can be in correct contact with the film; and a pad elevating mechanism is provided in order to avoid distortion of the film. The film is partially distorted when the pad is used, so that the image is adversely affected by the use of a pad. Accordingly, it is necessary that the pad is withdrawn except during the time of magnetic recording/reproducing. Further, it is necessary that the pad is withdrawn in order to allow the leading edge of the film to pass when the film is loaded into the camera.

As described above, a supporting apparatus for a magnetic head in which no pad is used is desired for the following reasons: it is difficult to accommodate the pad and a retracting mechanism for the pad in the limited space in a camera; and the film tends to be damaged by the contact of the pad. The present invention relates to a structure by which the film comes into correct contact with the head without using a pad. The present invention has features in which the structure is simple, and highly reliable recording/reproducing can be carried out.

The above-described problems can be overcome by a supporting apparatus for a magnetic head structured as follows: A magnetic head is in contact with a magnetic layer of a photographic film on which a transparent magnetic layer is coated, and at least, records information or reproduces information. The magnetic head is supported by a magnetic head supporting apparatus. The magnetic head supporting apparatus is characterized in that: circular rotating portions are provided which are respectively positioned at a front and rear of the magnetic head in the forwarding direction of the film; and a fixing member is provided in which V-shaped or circular bearing portions for axially supporting the rotating portions are provided. Alternatively, the supporting apparatus for a magnetic head is characterized in that: circular rotating portions are provided which are respectively positioned at the front and rear of the magnetic head in the forwarding direction of the film; at least two rotating members are provided which are in contact with each rotating portion respectively; and a fixing member for supporting the rotating members is provided.

PREFERRED EMBODIMENT OF THE INVENTION

Referring to FIG. 1 through FIG. 6, embodiments of the present invention will be described in detail below.

Figure 1:
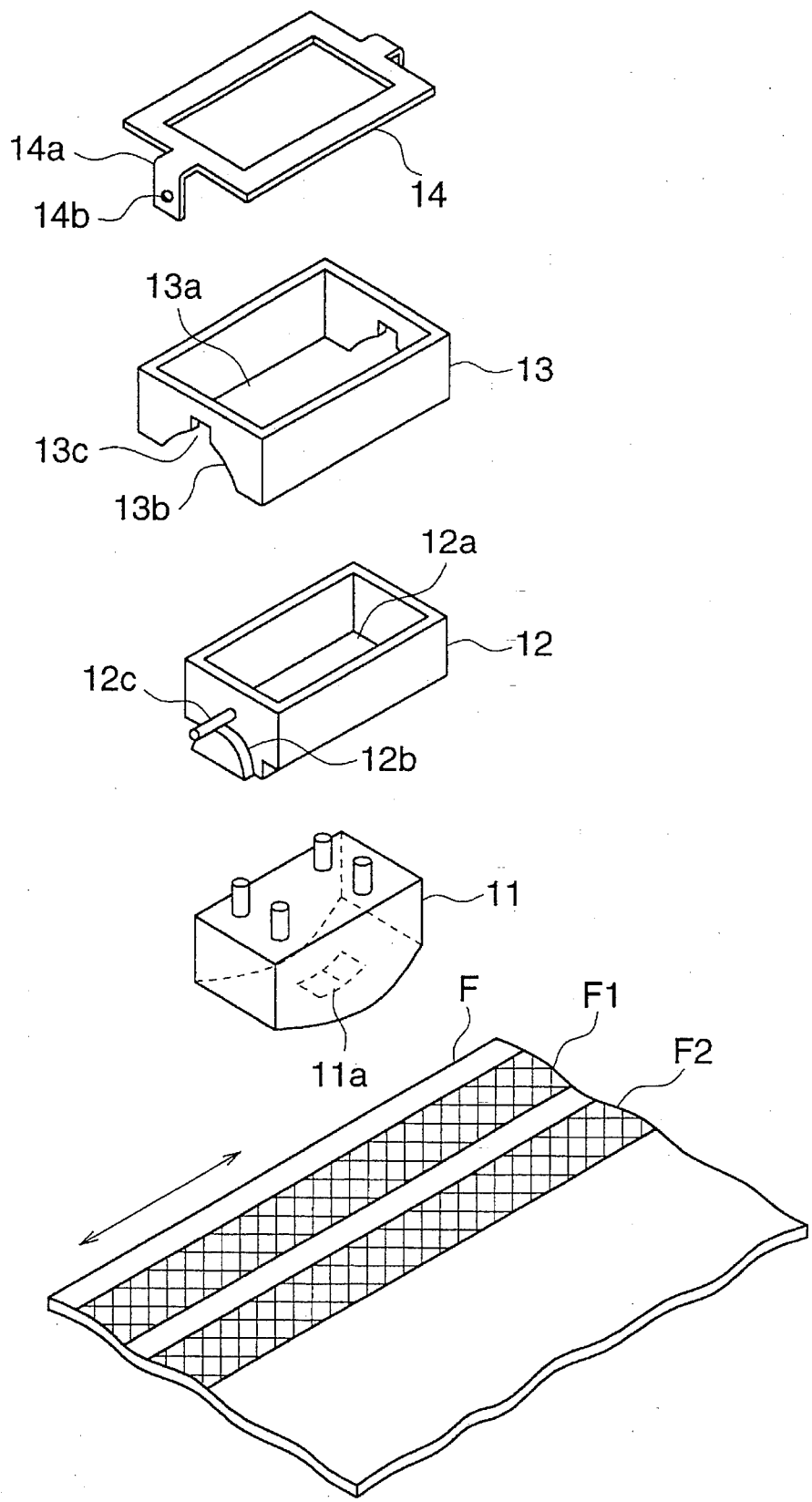
FIG. 1 is an exploded perspective view of the first embodiment.
Figure 2:
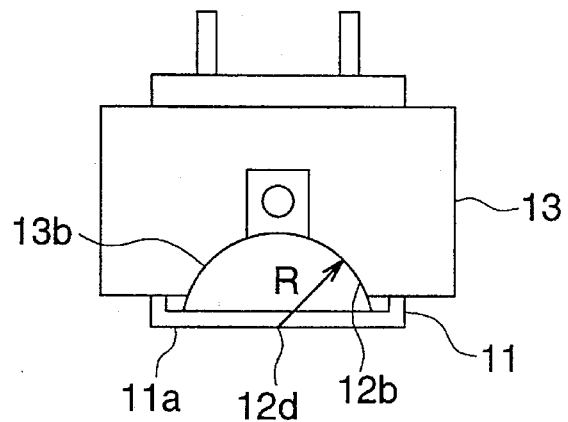
FIG. 2 is a side view of the first embodiment.
Figure 3:
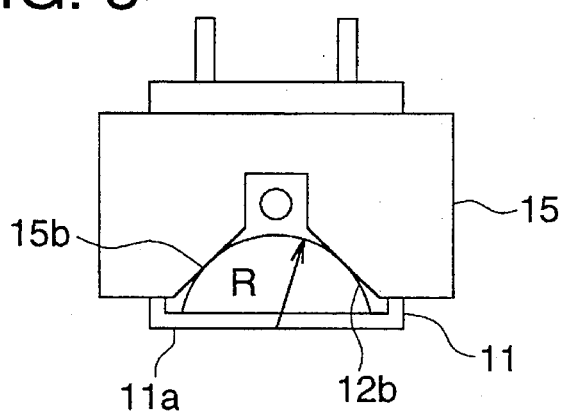
FIG. 3 is a view showing a modification of FIG. 2.

First, referring to FIG. 1, FIG. 2 and FIG. 3, the first embodiment will be described below. FIG. 1 is an exploded perspective view of a supporting apparatus for a magnetic head of the first embodiment. FIG. 2 is an enlarged side view after the supporting apparatus has been assembled. FIG. 3 is a modification of the supporting apparatus. In FIG. 1, F shows a film on which a transparent magnetic layer is coated. F1 and F2 show magnetic tracks, one of which is in contact with a gap 11a provided at the tip of a head 11 by a conventional means. The head 11 at least records information in or reproduces information from the magnetic track F1 of the film F, for example, which is moved in the arrowed direction. In this case, the film is not limited to a film, on the entire surface of which a transparent magnetic layer is coated, but it may be a film on which the magnetic layer is coated only partially. Numeral 12 is a head supporting frame. The head 11 is inserted into an open portion 12a provided at the center of the frame, and integrally fixed to the frame. Protrusions 12b, including circular-arc surfaces, are respectively provided on both sides of the frame which correspond to the movement direction of the film F, and pins 12c are respectively provided above each protrusion. In this case, the head supporting frame 12 and the protrusions 12b may be respectively manufactured from different materials, and may be integrally assembled. Numeral 13 is a fixing frame which is fixed to a predetermined apparatus. The head supporting frame 12 is inserted into an opening 13a provided in the center of the frame 13. The dimension of the opening 13a in the direction of the film movement is set in such a manner that very small spacing is formed with respect to the head supporting frame 12. The dimension of the opening 13a in the direction perpendicular to the direction of film movement is set in such a manner that sufficient spacing is provided with respect to the head supporting frame 12. Semi-circular recesses 13b and cut-out portions 13c are respectively provided on both sides of the fixing frame 13 in the direction of film movement. When the head supporting frame 12 is inserted into the fixing frame 13, the semi-circular protrusions 12b are in contact with the semicircular recesses 13b, and the pins 12c are located into the cut-out portions 13c. The external diameter of the pins 12c is smaller than the size of the cut-out portions 13c so that the pins 12c can be moved inside the cut-out portions 13b as the head supporting frame 12 rolls. Here, the protrusion 12b and the semi-circular recess 13b are preferably made of materials having a small coefficient of friction. Numeral 14 is a holding plate made of a thin stainless steel plate for a spring, and the holding plate is elastic. The width of the holding plate in the direction of the film movement is larger than the width of the fixing frame 13. Holes 14b in the tips of the arm portions 14a, which are respectively provided on both sides of the holding plate in the direction of the film movement, are engaged with the pins 12c of the head supporting frame 13. In this case, if the head supporting frame 12 does not disengage from the fixing frame 13, the holding plate 14 is not necessary.

FIG. 2 is a side view of an assembly of above described-members except for the holding plate 14. First, the head 11 is inserted into the head supporting frame 12 and integrally adhered to the frame by adhesion. Then, the head supporting frame 12 is inserted into the fixing frame 13, and after that, the holding plate 14 is placed on the fixing frame 13. The hole 14b of the tip of the arm portion 14a is then engaged with the pin 12c. The protrusion 12b, with circular-arc surface, is contacted with the semi-circular recess 13b by predetermined pressure, and thereby, the head supporting frame 12 is integrated with the fixing frame 13.

As shown in the side view in FIG. 2, the center of the circle 12d of the protrusion 12b can be set in such a manner that the center of the circle 12d is positioned in the vicinity of a line in which a point close to the center of the gap 11a provided on the tip portion of the head 11 is extended in the direction of the movement of the film F.

As shown in FIG. 3, the semi-circular recess 13b of the fixing frame 13 may be replaced with a V-shaped recess 15b.

Figure 4:
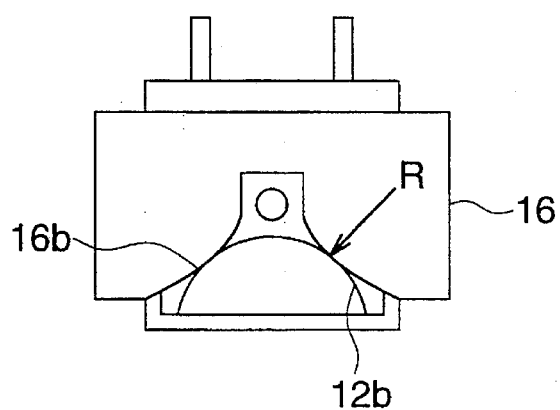
FIG. 4 is a view showing a modification of FIG. 2.

Further, as shown in FIG. 4, a fixing frame 16 having protruded circular arcs 16b may be used instead.

As a result, the head 11 is fixed to the head supporting frame 12 in the direction of the film movement. However, in the direction perpendicular to the direction of the film movement, the protrusion 12b, with circular surface, of the head supporting frame 12 rotates along the semi-circular recess 13b of the fixing frame 13, and the head 11 freely rolls with the head supporting frame 12 in a predetermined range. This predetermined range is determined by the spacing formed by the head supporting frame 12 and the opening portion 13a in the direction perpendicular to the direction of the film movement, or by spacing formed by the pin 12c and the cut-out portion 13c. As described above, a track of rolling of the head is previously determined. However, when the head 11 is rolled, the elastic holding plate 14 is deformed, and excess rolling is repressed by this repulsive force.

The holding plate 14 is subjected to the pulling force by the rolling of the pin 12c when the head 11 is rolled, which results in the horizontal restoring force of the head 11. However, the restoring force is against the force of rolling of the head 11 when the head follows the curl of the film. Therefore, when the restoring force is too large, rolling of the head is prevented when the head follows the film. Accordingly, the elasticity of the holding plate is preferably small.

Further, as described above, when the center of the circle 12d of the circular-surface protrusion 12b is set in such a manner that the center of the circle 12d is positioned on a line which is formed at a point close to the extended line from the center of the gap 11a in the direction of the film F movement; then, even when the head 11 is rolled while following the film curl, the gap 11a does not deviate left or right, so that the tracking is correctly performed.

Accordingly, the head 11 in the above-described supporting apparatus for the magnetic head rolls and follows along the curl of the film F in the direction perpendicular to the direction of the film movement. Therefore, good head contact can always be obtained. Accordingly, the magnetic head can reliably record the required information at the edge area of film having a large curl, or reproduce information from the film.

Figure 5:
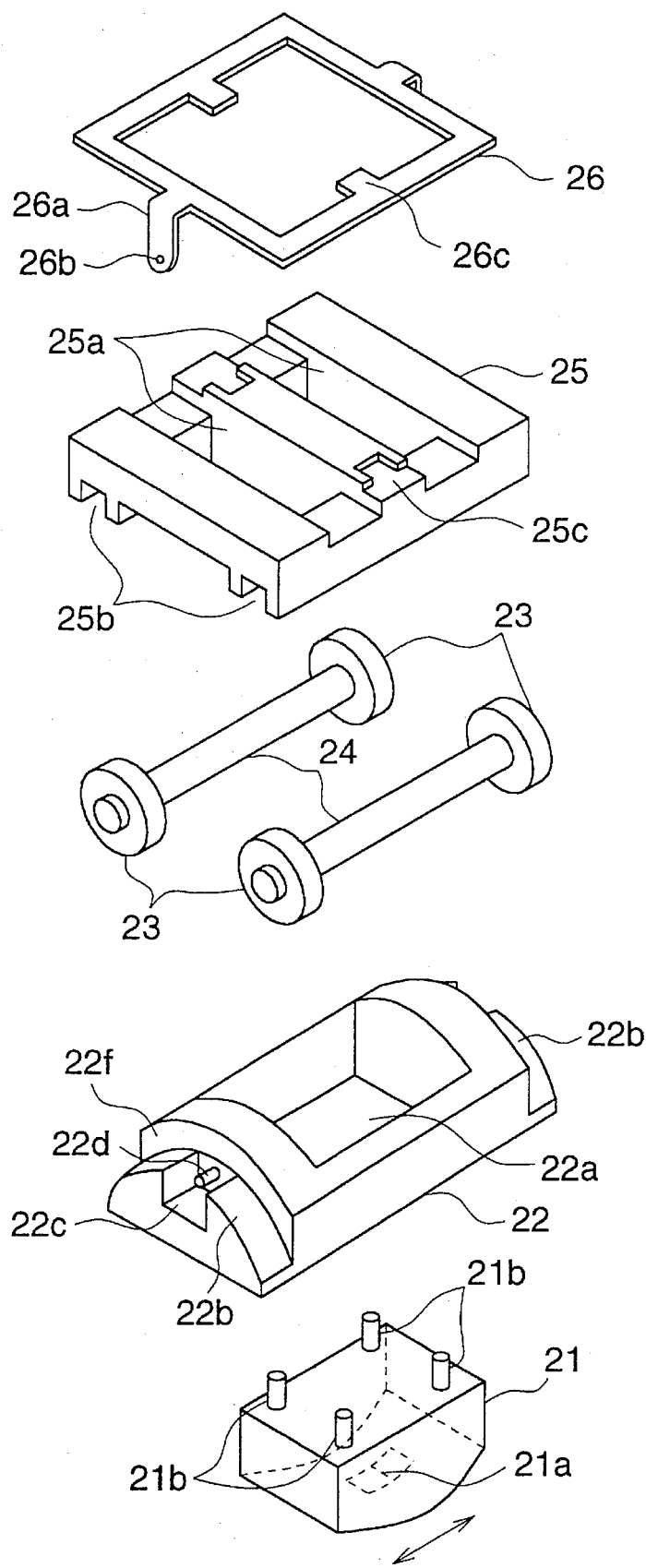
FIG. 5 is an exploded perspective view of the second embodiment.
Figure 6:
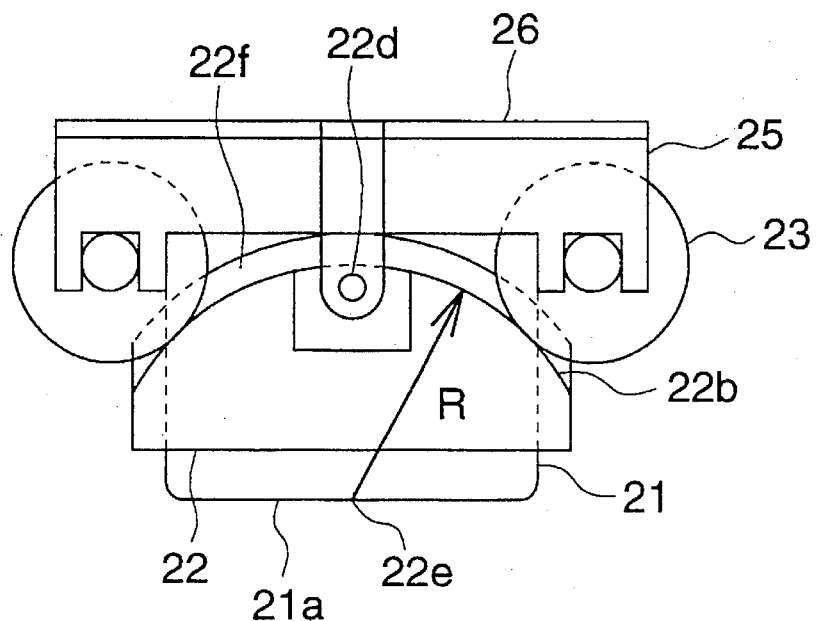
FIGS. 6(a) and 6(b) are side views of the second embodiment.
Figure 6:
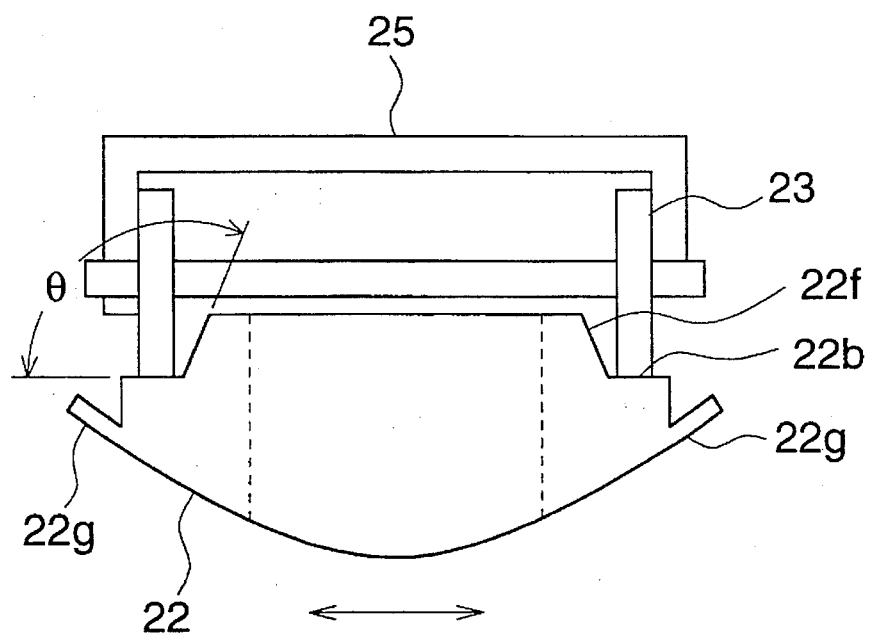

Referring to FIG. 5 and FIG. 6, the second embodiment will be explained below.

FIG. 5 is an exploded perspective view of a supporting apparatus for a magnetic head of the second embodiment. FIG. 6 is a side view of the apparatus after each member has been integrally assembled. In FIG. 5, numeral 21 is a head, which is in contact with the film F, not shown in the drawing, which is similar to that in FIG. 1. The head 21 at least records information in the magnetic layer on film which is moved in the arrowed direction, or reproduces information from the magnetic layer of the film through a gap 21a provided at the tip of the head 21. Numeral 22 is a head supporting frame. The head 21 is inserted into an opening portion 22a provided in the center of the frame 22, and is firmly adhered to the frame 22. Circular arc-shaped curved surfaces 22b are respectively provided on both sides of the supporting frame 22 in the direction of film movement. Collar-shaped contact surfaces 22f are provided on the head side of the curved surface 22b at the front and rear of the supporting frame 22 in the direction of film movement. Pins 22d are provided in cut-outs 22c formed in curved surfaces 22b. In this case, the head supporting frame 22 may be manufactured separately from the curved surface 22b, and they may be integrally assembled. Numeral 23 is rollers. Pairs of two rollers 23 positioned in the direction of the film movement are respectively integrally connected with shafts 24, and two pairs of such rollers 23 are provided. These rollers 23 are respectively in contact with circular arc-shaped curved surfaces 22b of the head supporting frame 22. Numeral 25 is a fixing frame. Two through holes 25a are provided in the center of the frame 25. Terminals 21b of the head 21 can pass through the through holes. Two slot-shaped bearings 25b are provided for the shafts 24 in the lower portion of the fixing frame 25, and the shafts 24 can rotate easily. Materials of a small friction coefficient are preferable for the curved surfaces 22b, rollers 23 and bearings 25b. Numeral 26 is a holding plate made of a thin elastic stainless steel plate for springs. Holes 26b are provided at the tip of two arms 26a, and pins 22d of the head supporting frame 22 can be respectively inserted into the holes. Two protrusions 26c provided in the central portion of the plate 26 are respectively inserted into cut-out portions 25c of the fixing frame 25, and thereby the position of the holding plate 26 is determined. In this case, if the head holding frame 22, rollers 23 and fixing frame 25 can be appropriately held, the holding plate 26 is not always necessary.

FIG. 6(a) is a side view after each member has been assembled which is viewed from the movement direction of the film. In FIG. 5, initially, the head is inserted into the opening portion 22a of the head supporting frame 22, and is firmly adhered integrally. Next, rollers 23 are respectively contacted with the circular arc-shaped curved surfaces 22b of the head supporting frame 22, while shafts 24 are inserted into the bearings 25b of the fixing frame 25. Then, the holding plate 26 is placed on the fixing frame 25. When pins 22d of the head supporting frame 22 are inserted into the respective holes 26b under the condition that the holding plate 26 is slightly bent, the head supporting frame 22, to which the head 21 is firmly adhered, can be held through rollers 23 with respect to the fixing frame 25. The main body of the holding plate 26 is positioned on the upper surface of the fixing frame 25. Accordingly, when the head supporting frame 22 is lifted, the holding plate 26 is further bent, and pushed against the fixing frame 25, thereby arm portions 26a of the holding plate 26 limit the positions of pins 22d. Therefore, the holding plate 26 acts as a disengagement prevention member, so that the head supporting frame 22 can not disengage from the apparatus. The holding plate 26 is slightly bent and pulls the supporting frame 22 under an assembled condition. In this case, the pulling force may be less than several grams. When the holding plate 26 is bent further, the plate 26 contacts with the fixing frame 25, thereby the plate 26 functions as a disengagement prevention member.

As shown in FIG. 6(a), the center of the circle 22e of the circular arc-shaped curved surface 22b is set in such a manner that it is positioned near the line in which a point close to the center of the gap 21a provided at the tip of the head 21 is extended in the direction of the film movement.

By the above-described structure of the supporting apparatus for the magnetic head, when the head 21 is subjected to the rotation force perpendicular to the direction of the film movement by the curl of the film, etc., the head supporting frame 22 is also rotated with the head 21. However, since rollers 23 come into rolling contact with the circular arc-shaped curved surface 22b, the friction force is very low, so that the head 21 can easily be rolled.

FIG. 6(b) is a side view seen from a position perpendicular to the direction of the film movement after the individual above-described members have been assembled. The movement of the supporting frame 22, together with the head 21, is limited when a collar-shaped contact surface 22f comes into contact with roller 23. The movement of the roller 23 itself is limited by the fixing frame 25, and therefore the head 21 is not pulled and moved in the direction of the film movement. Even when there is some amount of backlash between the collar-shaped contact surface 22f and the roller 23, the collar-shaped contact surface 22f comes into contact with the roller 23 located in the forwarding direction of the film, and the head stops. Therefore, the head 21 is not oscillated even slightly in the direction of the film movement, and thereby jitter is not caused at the time of signal recording/reproducing. Further, when the angle of the collar-shaped contact surface 22f with respect to the curved surface 22b is perpendicular or slightly obtuse ($\theta$), the roller 23 does not slide on the collar-shaped contact surface 22f, and can be lightly rolled. Further, when the head surface is extended so that extended surfaces 22g are formed at the front and the rear of the head surface in the direction of the film movement as shown in FIG. 6(b), a film, even if strongly curled, is not displaced to the roller 23 or near the fixing frame 25, and can be guided correctly onto the gap surface of the head 21 when the leading edge of the film passes under/over the head 21. The extended surface 22g of the head surface can be applied to the head supporting frame 12 in the first embodiment.

Further, when the head 21 is pressure contacted with film and the roller 23 is subjected to the force from the circular arc-shaped curved surface 22b, backlash is not caused during the roller operation since the roller 23 is subjected to the force given in the diagonal direction from the circular arc-shaped curved surface 22b and pushed against one of the wall surfaces in the bearing 25b even when there is backlash between the bearing 25b and the shaft 24.

As described above, since the center of the circle 22e of the circular arc-shaped curved surface 22b is set in such a manner that the center 22e is positioned on a line in which a point close to the center of the gap 21a is extended in the direction of the film movement, the gap 21a is not deviated left or right and the tracking is correct even when the head 21 follows the curl of the film and is rolled.

The holding plate 26 is subjected to a pulling force by the rolling of the pin 12c when the head 21 is rolled, which results in a horizontal restoring force of the head 21. However, the restoring force is against the force of rolling of the head 21 when the head follows the curl of the film. Therefore, when the restoring force is too large, rolling of the head is prevented when the head follows curled film. Accordingly, the elasticity of the holding plate 26 is preferably small.

Further, although two rollers 23 are connected with a single shaft 24 in this embodiment, four individual rollers may be independently provided, or even more than four rollers may be provided. Further, micro bearings may be used instead of rollers 23.

In embodiments shown in FIG. 5 and FIG. 6, although the curved surface 22b, collar-shaped contact surface 22f, and extended surface 22g of the head surface are shown as an integral structure with the head supporting frame 22, individual components may be combined.

Further, in order to record/reproduce information in and from the magnetic tracks located near both edges of the film using two pairs of the supporting apparatus for the magnetic head described in the first and second embodiments, a means for regulating the head relative position to the film is necessary. However, since this means is similar to that disclosed in U.S. patent application Ser. Nos. 8/222477, and 8/191875, which have been previously applied by the present inventors, explanation is omitted here.

Figure 7:
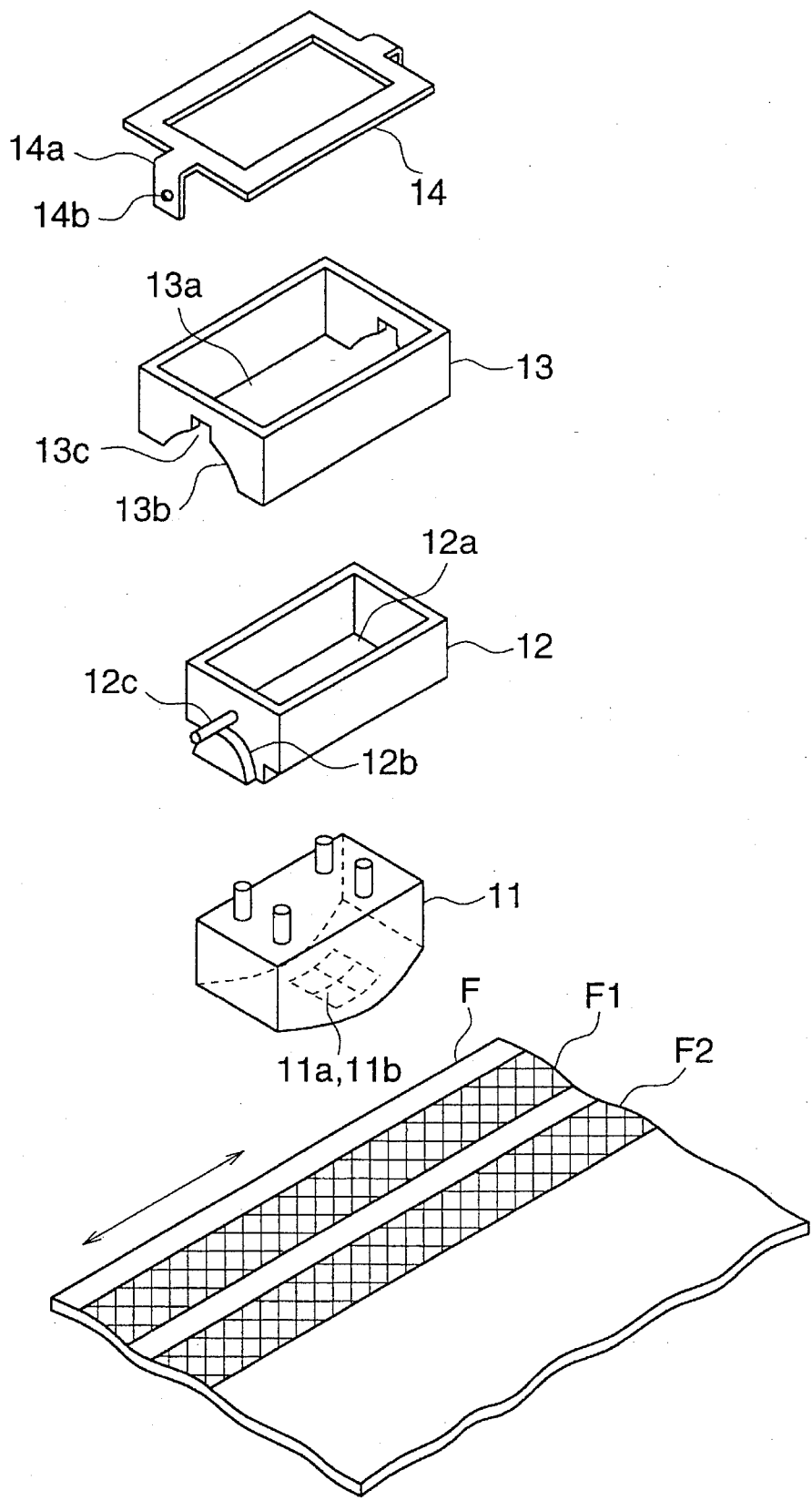
FIG. 7 is an exploded perspective view of a modification of the illustrated embodiments.

Further, the embodiments disclose the magnetic head, which is provided with only one gap, or one track; however, it is possible to apply the magnetic head, which is provided with plural gaps, for plural tracks to the embodiments as shown in FIG. 7 (the example shown in FIG. 7 has the magnetic head having two gaps for two tracks). Moreover, the supporting mechanism, for rotatably supporting the magnetic head, can be designed so that the relationship between the semi-circular recesses 13b of the mixing frame 13 and the semi-circular protrusions 12b of the head supporting frame 12 switched. In other words, it is possible to provide the fixing frame 13 with semi-circular protrusions and to provide the head supporting frame 12 with semi-circular recesses.

As detailed above, the following effects can be positively realized by the simple structure according to the present invention.

① The magnetic head can be rolled by a very light rotation force with respect to film which is curled in a direction perpendicular to the film movement, so that contact of the film magnetic surface with the magnetic gap is very satisfactory.

② Since the center of the rolling of the magnetic head is equal to the center of the curvature of the circular arc of the head supporting frame, the position of the magnetic gap is fixed even when the head is inclined corresponding to the curl of the film, and accurate tracking can be carried out even when the width of the magnetic track is narrow.

③ Since the head supporting frame, fixing frame, etc. are formed of solid parts, deformation and vibration are not caused even when external disturbance force is applied. Accordingly, jitter (variation of the time axis) is not caused during recording/reproducing. Since the supporting system is strong, reliability is high and failures are rarely caused even when the apparatus is used in a printer under heavy duty laboratory processing.

What is claimed is:

1. A magnetic head supporting apparatus for supporting a magnetic head for writing and reading information on a magnetic layer of a photographic film by tracing said magnetic layer with said magnetic head in a predetermined conveyance direction of said photographic film, comprising:

a fixing frame including a solid first connecting portion;

a head supporting frame for supporting said magnetic head, said head supporting frame including a solid second connecting portion contacting said solid first connecting portion so that said head supporting frame pivots with respect to said fixing frame; and a member for restricting movement of said head supporting frame.

2. A magnetic head supporting apparatus for supporting a magnetic head for writing and reading information on a magnetic layer of a photographic film by tracing said magnetic layer with said magnetic head in a predetermined conveyance direction of said photographic film, comprising:

a fixing frame including a first connecting portion, said first connecting portion comprising recess portions positioned at opposite sides of said fixing frame so that said recess portions can be aligned with said predetermined conveyance direction; and a head supporting frame for supporting said magnetic head, said head supporting frame including a second connecting portion comprising protrusions having a circular-arc surface, each of said protrusions being positioned at opposite sides of said head supporting frame so that said protrusions can be aligned with said predetermined conveyance direction, and each of said protrusions being movably supported by a respective one of said recess portions so that said head supporting frame pivots with respect to said fixing frame.

3. The magnetic head supporting apparatus of claim 2, wherein said recess portions have a shape selected from a semi-circular shape, V-shape, and a shape with protruded circular arcs.

4. The magnetic head supporting apparatus of claim 2, wherein said circular-arc protrusions of said head supporting frame are aligned with an axis crossing a center of a head-gap of said magnetic head, said axis being parallel to said predetermined conveyance direction.

5. A magnetic head supporting apparatus for supporting a magnetic head for writing and reading information on a magnetic layer of a photographic film by tracing said magnetic layer with said magnetic head in a predetermined conveyance direction of said photographic film, comprising:

a fixing frame including a first connecting portion, said first connecting portion comprising protrusions having a circular-arc surface, said protrusions being positioned at opposite sides of said head supporting frame so that said protrusions can be aligned with said predetermined conveyance direction; and a head supporting frame for supporting said magnetic head, said head supporting frame including a second connecting portion comprising recess portions positioned at opposite sides of said fixing frame so that said recess portions can be aligned with said predetermined conveyance direction, each of said recess portions movably supporting a respective one of said protrusions so that said head supporting frame pivots with respect to said fixing frame.

6. The magnetic head supporting apparatus of claim 5, wherein said recess portions have a shape selected from a semi-circular shape, V-shape, and a shape with protruded circular arcs.

7. The magnetic head supporting apparatus of claim 5, wherein said circular-arc protrusions of said head supporting frame are aligned with an axis crossing a center of a head-gap of said magnetic head, said axis being parallel to said predetermined conveyance direction.

8. A magnetic head supporting apparatus for supporting a magnetic head for writing and reading information on a magnetic layer of a photographic film by tracing said magnetic layer with said magnetic head in a predetermined conveyance direction of said photographic film, comprising:

a head supporting frame for supporting said magnetic head, said head supporting frame including semi-circular protrusions positioned at opposite sides of said head supporting frame so that said protrusions can be aligned with said predetermined conveyance direction; and a fixing frame for pivotally supporting said head supporting frame means, said fixing frame including two pairs of rollers, each of said pairs of rollers having an axial shaft therebetween so that said shaft can be oriented parallel to said predetermined conveyance direction, said pairs of rollers movably supporting said semi-circular protrusions of said head supporting frame means.

9. The magnetic head supporting apparatus of claim 8, said semi-circular protrusions of said head supporting frame are aligned with an axis crossing a center of a head-gap of said magnetic head, said axis being parallel to said predetermined conveyance direction.

* * * * *